UNITED STATES PATENT OFFICE.

VICENTE MARCANO, OF CARACAS, VENEZUELA, ASSIGNOR, BY MESNE ASSIGNMENTS, TO THE MOSQUERA JULIA FOOD COMPANY, OF DETROIT, MICHIGAN.

MAKING PEPTONES.

SPECIFICATION forming part of Letters Patent No. 441,180, dated November 25, 1890.

Application filed July 31, 1889. Serial No. 319,318. (Specimens.)

*To all whom it may concern:*

Be it known that I, VICENTE MARCANO, of Caracas, Republic of Venezuela, a citizen of the Republic of Venezuela, have invented certain new and useful Improvements in Making Pure Peptones, of which the following is a specification.

In a communication addressed to the French Academy of Science and published in the *Compte Rendues*, No. 107, page 117, June 2, 1888, I have described the discovery made by me that certain plants contain organic vegetable ferments which exert a special action on fibrine, converting the same in pure peptones and which can consquently be utilized as peptonizing agents on the albuminoids, and especially meat.

This invention is based on this discovery and relates to the production of pure peptones by the use of these organic vegetable ferments, and more especially such ferments as are contained in the plants belonging to the family of *Bromeliaceas*, (Linne,) of which the *Ananassa vulgaris* (pine-apple) is the best-known type.

The invention consists in the process of subjecting meat in finely-chopped state to the action of said organic vegetable ferments as contained in the juice expressed from said plants and subjecting the same to heat until peptonization takes place.

The peptones are obtained by adding to the liquid peptonized meat an additional quantity of warm water, and then separating the pure peptones in liquid state by filtering the mass and evaporating the same into a paste or into a dry state.

In practically carrying out my invention I take four kilograms of lean meat finely chopped and mix the same with four hundred and fifty cubic centimeters of juice obtained from the common pine-apple, (*Ananassa vulgaris*,) which juice is diluted with the same quantity—to wit, four hundred and fifty cubic centimeters—of water, preferably distilled. The meat and juice are subjected slowly to about a temperature of from 45° to 50° Celsius for from three to four hours and continually stirred during this time, after which the temperature is preferably raised to 60° Celsius, at which temperature the whole mass becomes dissolved, so as to form a thick liquid or paste. At this stage the meat has been perfectly digested by the juice of the pine-apple, owing to the action of organic vegetable ferments contained in the same, so that the meat is entirely peptonized by the same. In place of the juice of the pine-apple the juice of any other fruit of the *Bromeliaceas* family, or even the juice of the leaves, may be employed, though the juice of the fruit is preferred. From this liquid peptonized meat pure peptones, in liquid, pasty, or dry form, can be obtained in the following manner: A quantity of the liquid peptonized meat is diluted with some warm water and then filtered, the liquid containing the pure peptone. This liquid peptone is then evaporated at a temperature not exceeding 60° Celsius and reduced either to a paste or to a dry state. The pure peptones thus obtained can be mixed with other substances, solid or liquid, so as to form different food products.

The characteristics of my pure peptones are, first, perfect solubility in water, whether cold or warm; secondly, absolute freedom from foreign admixtures, such as salt, starch, and the like, and, thirdly, a high percentage of nitrogen—to wit, about eleven per cent.—being greater than that contained in the peptones obtained by other known processes.

Having thus described my invention, I claim as new and desire to secure by Letters Patent—

1. The process herein described of making pure peptones, which consists in subjecting finely-chopped meat to the action of vegetable organic ferments until peptonization takes place, then dissolving the peptonized meat thus obtained in water, and filtering it, so as to obtain pure peptones, substantially as set forth.

2. The process herein described of making pure peptones, which consists in subjecting finely-chopped meat to the action of organic vegetable ferments contained in the juice of the plants of the family of *Bromeliaceas* until peptonization takes place, then dissolving the peptonized meat thus obtained in water, and filtering it, so as to obtain pure peptones, substantially as set forth.

3. The herein-described meat-peptone, the same containing all the soluble nutritive compounds of meat, including the soluble inorganic salts of meat, said peptone being perfectly soluble in cold or warm water and free from admixture of any foreign substances—such as salt, starch, and the like—the same containing not less than eleven per cent. of nitrogen and being obtained by submitting finely-chopped meat to the action of the juice expressed from the *Bromeliaceas* plants until peptonization takes place, dissolving the peptonized meat in water, and filtering it, substantially as set forth.

4. The herein-described process of making peptone, consisting of digesting albumen or an albuminoid by the organic ferment of the juice of a plant of the *Bromeliaceas* family.

5. As a new article of manufacture, a food product consisting of an albumen or an albuminoid digested in the organic ferment of the juice of a plant of the *Bromeliaceas* family.

In testimony that I claim the foregoing as my invention I have signed my name in the presence of two subscribing witnesses.

VICENTE MARCANO.

Witnesses:
L. JULIA,
J. A. MOSQUERA, Hijo.